(12) United States Patent
Kubota et al.

(10) Patent No.: US 6,240,111 B1
(45) Date of Patent: May 29, 2001

(54) LASER BEAM GENERATING APPARATUS AND METHOD

(75) Inventors: Shigeo Kubota; Nobuhiko Umezu; Tatsuo Fukui, all of Kanagawa; Hisashi Masuda, Tokyo; Koichi Tatsuki, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/289,244

(22) Filed: Apr. 9, 1999

(30) Foreign Application Priority Data

Apr. 15, 1998 (JP) .................................... 10-105128

(51) Int. Cl.[7] .............................. H01S 3/10; H01S 3/13; H01S 3/04; H01S 3/091
(52) U.S. Cl. ............................. 372/21; 372/20; 372/22; 372/28; 372/32; 372/34; 372/35; 372/70
(58) Field of Search ..................... 372/20, 21, 22, 372/28, 32, 34, 35, 70

(56) References Cited

U.S. PATENT DOCUMENTS

| | | | |
|---|---|---|---|
| 5,144,629 | * | 9/1992 | Basu ........................................ 372/20 |
| 5,862,163 | * | 1/1999 | Umezu et al. .......................... 372/21 |
| 6,002,697 | * | 12/1999 | Govorkov et al. ..................... 372/34 |
| 6,101,201 | * | 8/2000 | Hargis et al. ........................... 372/36 |

FOREIGN PATENT DOCUMENTS

| | | | |
|---|---|---|---|
| 62-162374 | 7/1987 | (JP) | .................................. H01S/3/09 |
| 62-162377 | 7/1987 | (JP) | .................................. H01S/3/09 |

* cited by examiner

Primary Examiner—Frank G. Font
Assistant Examiner—Armando Rodriguez
(74) Attorney, Agent, or Firm—Oblon, Spivak, McClelland, Maier & Neustadt, P.C.

(57) ABSTRACT

A laser beam generating apparatus comprising a first laser beam source oscillating in a near infrared-ray region of, for example, an Nd:YAG laser to generate a laser beam, a second higher harmonic wave generator for generating, from the laser beam emitted from the first laser beam source, a second higher harmonic wave having a half wavelength of the laser beam emitted from the first laser beam source, a splitter for splitting the second higher harmonic wave, a second laser beam source which is supplied with a part of the second higher harmonic wave thus split is input to a Ti:Sapphire laser to be excited and oscillated, thereby generating a laser beam of substantially 700 nm in wavelength, a fourth higher harmonic wave generator for generating a fourth higher harmonic wave from the remaining part of the second higher harmonic wave thus split, a sum frequency mixing composed of a BBO crystal device to which the laser beam of substantially 700 nm in wavelength and the fourth higher harmonic wave are input, and a controller for controlling the temperature of the BBO crystal device to substantially 100K or less, thereby generating a laser beam of substantially 193 nm in wavelength as an output of the sum frequency mixing.

14 Claims, 4 Drawing Sheets

LASER BEAM GENERATING APPARATUS AND METHOD

BACKGROUND OF THE INVENTION

1. Field of the Invention

The present invention relates to laser beam generating apparatus and method, and more particularly to laser beam generating apparatus and method for generating CW (continuous wave) or pulse laser beams of short wavelength by using a non-linear optical crystal device (BBO).

2. Description of the Related Art

Recently, the microstructure of semiconductor devices has been increasingly enhanced, and this enhancement of the microstructure of the semiconductor devices has also caused increasing requirements to shorten the wavelengths of light beams emitted from light sources in an exposure process for use in a semiconductor device manufacturing process. Of these light sources used in the exposure process, a YAG full solid-state laser for generating fifth higher harmonic wave of 213 nm in wavelength by using β-BaB$_2$O$_4$ (hereinafter referred to as "BBO") which is a non-linear optical crystal device has been expected as a light source for the semiconductor exposure process.

Besides, the market has required in an earlier stage that light sources of the next generation should have wavelengths of 200 nm or less. At the present situation, the requirement to shorten the wavelength of the light source to be less than 200 nm has not been satisfied for the full solid-state laser insofar as the BBO crystal device is used because the transmittance of the BBO crystal is sharply reduced in the wavelength range of 200 nm or less. For example, in the case of 3.5 mm-thickness BBO crystal, the transmittance at the same wavelength as an ArF excimer laser is sharply reduced from 70% to 10% which contains the surface reflectance of the end face of the crystal.

In order to avoid this problem, there has been proposed a method of producing 205 nm or 201 nm wavelength. However, this method has not yet been practically used (Japanese Unexamined Patent Applications No. Sho-62-162374, No. Sho-62-162377). Further, there has been proposed a method of producing 193 nm wavelength from the sum of 213 nm wavelength of YAG fifth higher harmonic and 2.0 μm of infrared ray by using an LBO (LiB$_3$O$_5$) crystal device at the final stage. However, a light source based on this method outputs only small output power, and it is difficult to obtain large output power.

The BBO crystal is one of crystals which are most suitable for practical use and highest reliability in lots of wavelength-converting non-linear optical crystals. If the full solid-state laser having the light source which is easier in maintenance, more compact in size and higher in efficiency and quality as compared with the ArF excimer laser, can produce the same wavelength (193 nm) as the ArF excimer laser with the same-level laser power as the ArF laser, its contribution to the industries would be extremely great.

SUMMARY OF THE INVENTION

The present invention has been implemented in view of the foregoing description, and has an object to provide laser beam generating apparatus and method which can achieve, at a practical level, a coherent ultraviolet light source in a wavelength range of 200 nm or less which is shorter in wavelength than that of a conventional BBO crystal device, by using a BBO crystal device which can be easily handled and highly practically used and give satisfactory results in the wavelength range above 200 nm.

In order to attain the above object, a laser beam generating apparatus according to a first aspect of the present invention has a BBO crystal device and means for controlling the temperature of the BBO crystal device at 273K or less, thereby generating a CW (continuous wave) or pulse laser beam of 200 nm or less in wavelength by utilizing a non-linear optical effect.

A laser beam generating apparatus according to a second aspect of the present invention is characterized by comprising: a first laser beam source which oscillates in a near infrared-rays region of any one of a solid-state laser such as Nd-ion doped Nd:YAG, Nd:YVO$_4$, Nd:YLF, Nd:YAD, Nd:Glass or the like, a solid-state laser such as Cr-ion doped CR:LiSAF, Cr$^{4+}$:Forsterite or the like; second higher harmonic wave generating means for generating, from the laser beam emitted from the first laser beam source, a second higher harmonic wave having a half wavelength of the first laser beam source; splitting means for splitting the second higher harmonic wave; a second laser beam source for inputting a part of the second higher harmonic wave thus split to a Ti:Sapphire laser or alexandrite laser to excite and oscillate the laser and generate a laser beam of substantially 700 nm in wavelength; fourth higher harmonic wave generating means for generating a fourth higher harmonic wave from the remaining part of the second higher harmonic wave; sum frequency mixing means comprising a BBO crystal device to which a laser beam of substantially 700 nm in previous wavelength and the fourth higher harmonic wave are input, and means for controlling the temperature of the BBO crystal device to substantially 100K or less, thereby obtaining a CW or pulse laser beam of substantially 193 nm in wavelength as an output of the sum frequency mixing means.

A laser beam generating method according to a third aspect of the present invention in which a BBO crystal device is used to utilize a non-linear optical effect, is characterized by comprising a step of controlling the temperature of the BBO crystal device to 273K or less, thereby generating a CW or pulse laser beam of 200 nm or less in wavelength.

A laser beam generating method according to a fourth aspect of the present invention is characterized by comprising: a second higher harmonic wave generating step of generating a second higher harmonic wave from a first laser beam source which oscillates in a near infrared-rays region of any one of a solid-state laser such as Nd-ion doped Nd:YAG, Nd:YVO$_4$, Nd:YLF, Nd:YAD, Nd:Glass or the like, a solid-state laser such as Cr-ion doped Cr:LiSAF, Cr$^{4+}$:Forsterite or the like, the second higher harmonic wave having a half wavelength of the first laser beam source; a splitting step of splitting the second higher harmonic wave; a laser beam generating step of inputting a part of the second higher harmonic wave to a second laser beam source such as a Ti:Sapphire laser to excite and oscillate the laser and generate a laser beam of substantially 700 nm in wavelength; a fourth higher harmonic wave generating step of generating a fourth higher harmonic wave from the remaining part of the second higher harmonic wave; sum frequency mixing step using a BBO crystal device to which a laser beam of substantially 700 nm in previous wavelength and the fourth higher harmonic wave are input; and a step of controlling the temperature of the BBO crystal device to substantially 100K or less, thereby obtaining a CW or pulse laser beam of substantially 193 nm in wavelength as an output of the sum frequency mixing step.

In the laser beam generating apparatus of the first aspect of the present invention and the laser beam generating method of the third aspect of the present invention, it is preferable to preserve the BBO crystal device in refrigerant through a cold finger which is thermally brought into contact with the BBO crystal device, the refrigerant being supplied and controlled to substantially 273K or less with ±0.1K by any one of an electrical cooling device such as Peltier element or the like, a liquid nitride cryostat, an He cryostat, a Stirling refrigerating machine and a closed cycle refrigerating machine. Further, it is preferable to preserve the BBO crystal device in an adiabatic vacuum container.

In the laser beam generating apparatus of the second aspect of the present invention and the laser beam generating method of the fourth aspect of the present invention, it is preferable to preserve the BBO crystal device in refrigerant through a cold finger which is thermally brought into contact with the BBO crystal device, the refrigerant being supplied and controlled to substantially 100K or less with ±0.1K by any one of a liquid nitrogen cryostat, an He cryostat, a Stirling refrigerating machine and a closed cycle refrigerating machine. Further, it is preferable to preserve the BBO crystal device in an adiabatic vacuum container.

According to the laser beam generating apparatus of the first aspect and the laser beam generating method of the third aspect, by utilizing the non-linear optical effect based on the BBO crystal device and preserving the BBO crystal device at the temperature of 273K or less, the CW or pulse laser beam of 200 nm in wavelength can be easily generated with satisfying the transmittance at the wavelength of 200 nm or less and without greatly reducing the laser power.

According to the laser beam generating apparatus of the second aspect and the laser beam generating method of the fourth aspect, by utilizing the non-linear optical effect based on the sum frequency mixing means using the BBO crystal device and preserving the BBO crystal device at the temperature of substantially 100K or less, the CW or pulse laser beam of substantially 193 nm in wavelength can be easily obtained with satisfying the transmittance at substantially 193 nm wavelength and without greatly reducing the laser power.

DETAILED DESCRIPTION OF THE PREFERRED EMBODIMENT

A preferred embodiment according to the present invention will be described hereunder with reference to the accompanying drawings.

In the following embodiments, a laser beam generating apparatus and a laser beam generating method which generate a laser beam of substantially 193 nm in wavelength will be representatively described with reference to FIGS. 1 to 5.

Figure 1:
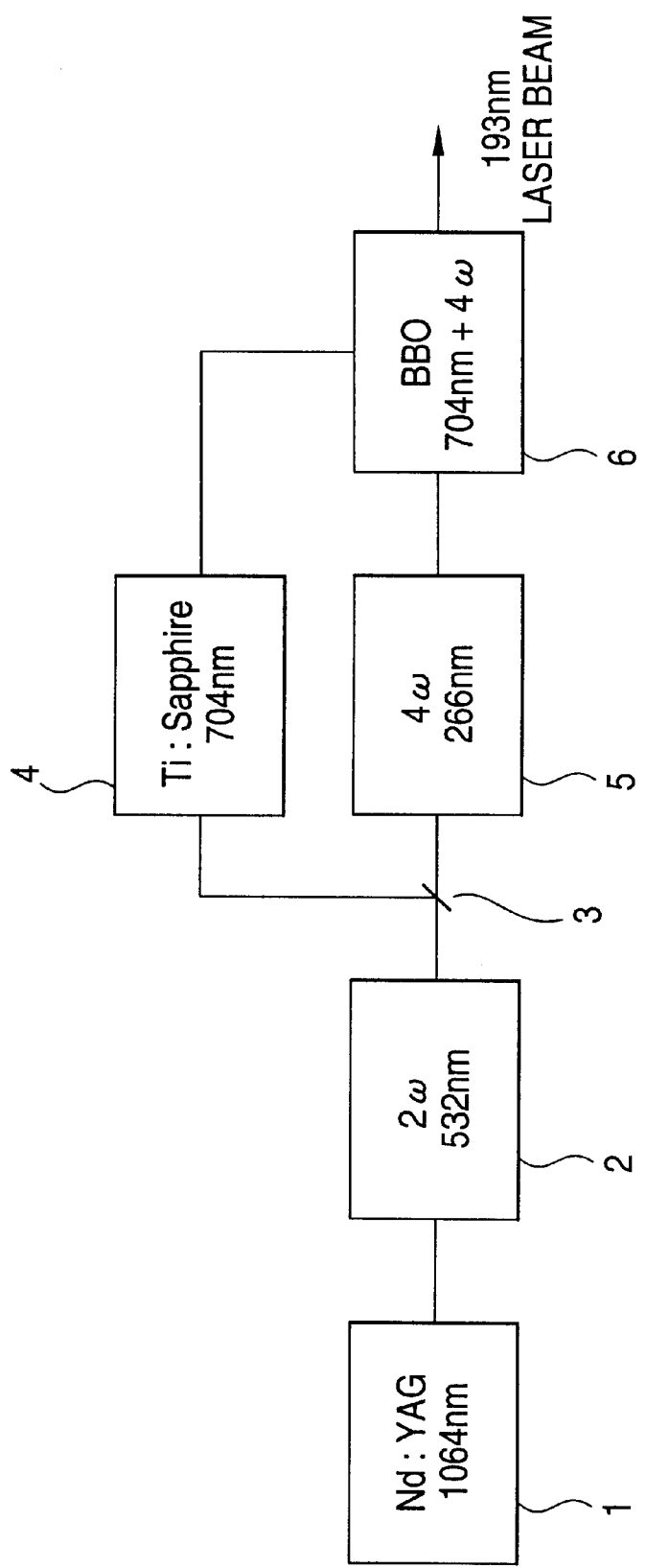
FIG. 1 is a block diagram showing generation of a short-wavelength laser beam according to an embodiment of the present invention.

FIG. 1 is a block diagram for generation of a laser beam of substantially 193 nm in wavelength.

In FIG. 1, a laser beam of 1,064 nm in wavelength is generated by using a laser beam source such as an Nd:YAG laser or the like as a first laser beam source 1. Subsequently, a second higher harmonic wave of 532 nm in wavelength is generated on the basis of the 1,064 nm-wavelength laser beam by second higher harmonic generating means 2 such as an LBO crystal device or the like. Thereafter, the second higher harmonic wave thus generated is split into two beams by splitting means 3 such as a beam splitter or the like.

A part of the second harmonic wave thus split is input to a second laser beam source 4 such as a Ti:Sapphire laser or the like to excite and oscillate the laser, thereby generating a laser beam of 704 nm in wavelength. On the basis of the remaining part of the second harmonic wave thus split, a fourth higher harmonic wave of 266 nm in wavelength is generated by fourth higher harmonic wave generating means 5 using second higher harmonic wave generating means such as an LBO crystal device or the like.

The 704 nm-wavelength laser beam and the 266 nm-wavelength fourth higher harmonic wave are input to sum frequency mixing means 6 to generate a laser beam of 193 nm in wavelength (the wavelength of the sum frequency mixing).

Figure 2:
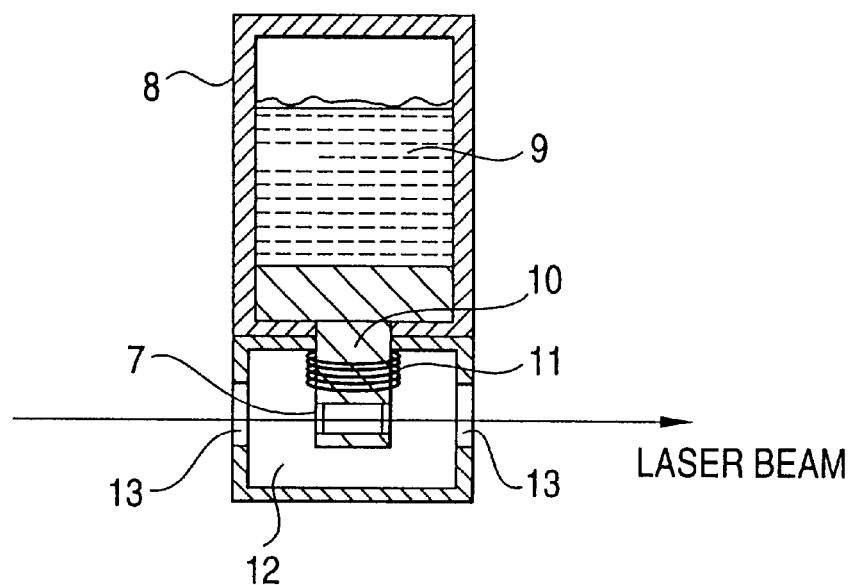
FIG. 2 is a cross-sectional view showing a temperature control method for BBO crystal device.
Figure 3:
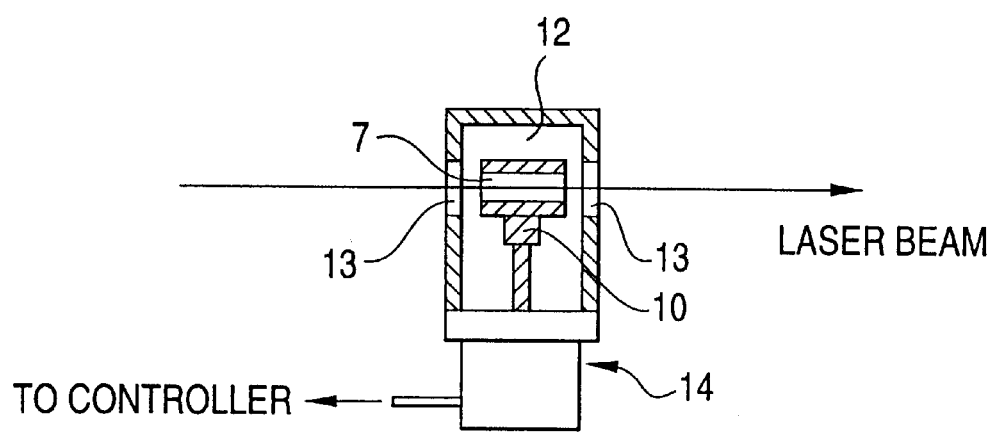
FIG. 3 is a cross-sectional view showing a temperature control method for BBO crystal device.

In this case, as shown in FIG. 2, an adiabatic vacuum container 12 is supplied with refrigerant 9 such as liquid He or liquid $N_2$ by an He cryostat, a liquid nitrogen cryostat or the like while the temperature of the refrigerant is kept to 100K or less with +0.1K, and the BBO crystal device 7 is preserved under the above temperature condition in the adiabatic vacuum container 12 through a cold finger 10 which is brought into thermal contact with the BBO crystal device 7. The cold finger 10 is formed of copper or the like, and the temperature thereof can be controlled by a heater 11. As shown in FIG. 2, the laser beam is incident from a window 13 of quartz or $MgF_2$ or $CaF_2$ or other window for DUV at the light incident side of the adiabatic vacuum container 12, passes through the BBO crystal device 7 and then emits from a window 13 at the light emission side. The refrigerant 9 may be supplied by using a cooling apparatus 14 such as a Stirling refrigerating machine or the like as shown in FIG. 3.

In order to suppress surface reflection of the incident light, a Brewster incident face is preferably formed on the end face of the crystal of the BBO crystal device 7, or non-reflection coating corresponding to the wavelength of the incident light and the wavelength of the emitted light may be provided.

Next, the transmittance characteristic in the ultraviolet region of the BBO crystal device 7 will be described.

Figure 4:
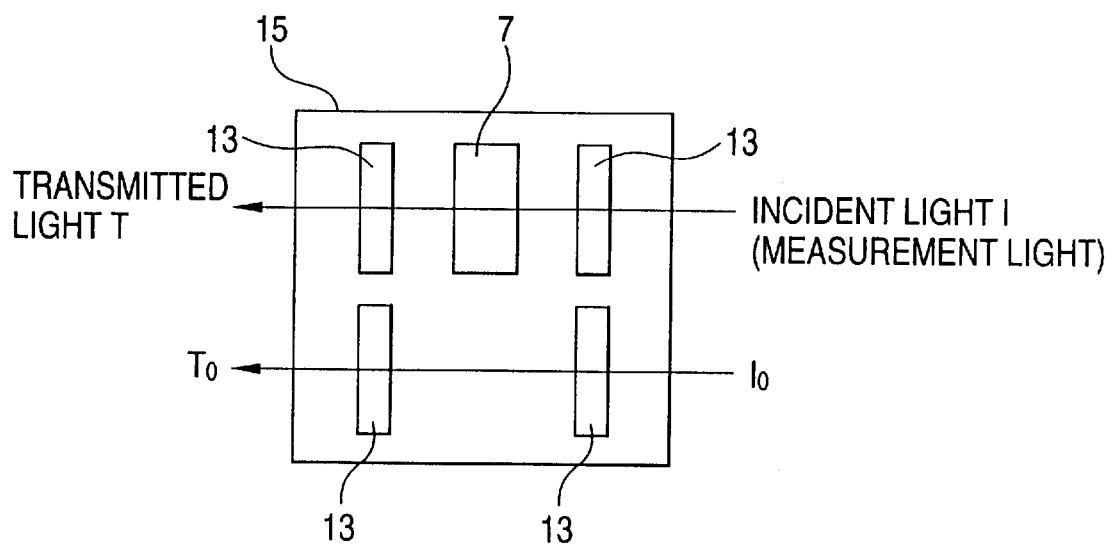
FIG. 4 is a diagram showing a transmittance measuring method for BBO crystal device.

The transmittance in the ultraviolet region of the BBO crystal device 7 is measured by a transmission spectral characteristic measuring device as shown in FIG. 4. A BBO crystal device 7 of 3.5 mm thickness is put in a measurement cell 15 having windows 13 of quartz. A measurement light beam having a light intensity I and a reference light beam having a light intensity of $I_0$ are incident to the measurement cell 15 to measure the spectrum of the transmittance $T_x=T/T_0$ defined by the ratio of the light intensities T and To of the transmitted light beams after passed through the windows 13.

Figure 5:
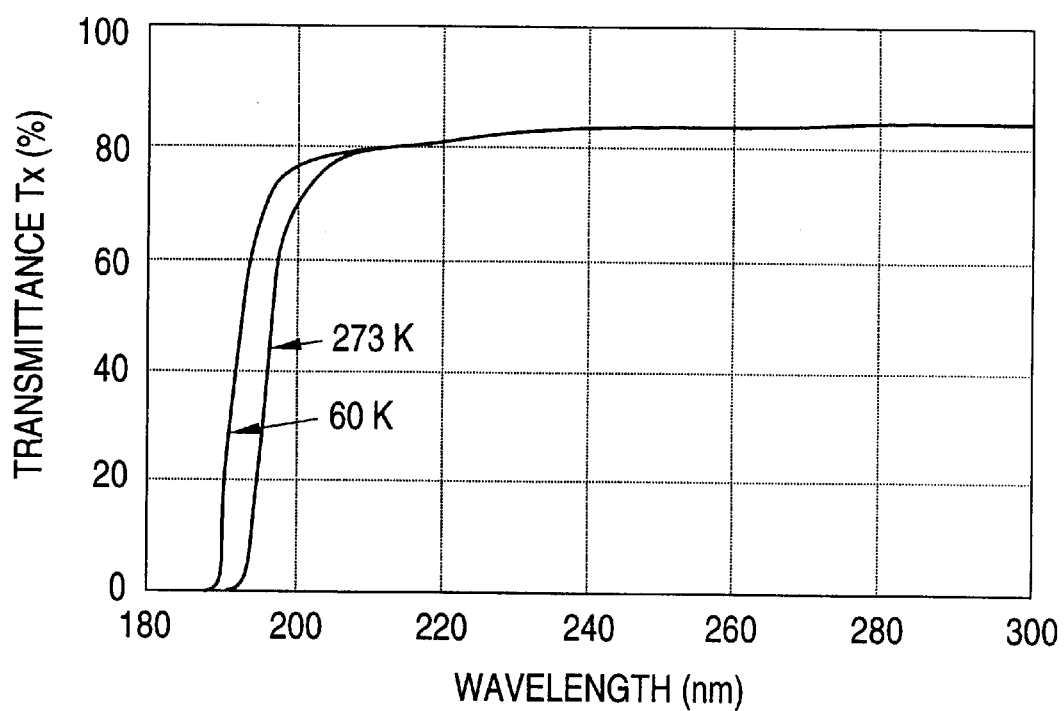
FIG. 5 is a diagram showing transmission spectral characteristics.

FIG. 5 shows a measurement result of the transmission spectral characteristic representing the relationship between the transmittance $T_x$ of the BBO crystal device and the wavelength with respect to the preservation temperature of the BBO crystal device, for example at 60K and 273K. From FIG. 5, it is apparent that the transmittance at 193 nm in wavelength satisfies 50% or more under the temperature of 60K or less. Further, it is apparent that the transmittance at 200 nm in wavelength satisfies 70% or more under the temperature of 273K or less.

Accordingly, the substantially 193 nm-wavelength laser beam having a sufficient intensity can be obtained by using the BBO crystal device which is preserved at substantially 100K or less, for example, and thus the laser generating apparatus of the present invention is practically usable as a light source for an exposure apparatus used in an exposure process of a semiconductor device manufacturing process, a manufacturing process for a master plate of an optical recording medium or the like, etc., and a recording/ reproducing device for an optical recording medium, etc. Likewise, the CW or pulse laser beam of 200 nm or less in wavelength can be easily obtained by using the BBO crystal device preserved at 273K or less, for example, and thus the present invention can be applied to various fields using a short-wavelength laser as a light source.

According to the laser generating apparatus and method of the present invention, the laser beam source for emitting laser beams which have sufficient intensities for practical use and wavelength of 200 nm or less.

What is claimed is:

1. A laser beam generating apparatus, comprising:
   a BBO crystal device; and
   means for controlling the temperature of said BBO crystal device to 273K or less, thereby generating a laser beam of 200 nm or less in wavelength by utilizing a non-linear optical effect.

2. The laser beam generating apparatus as claimed in claim 1, wherein said temperature control means has a cold finger which is brought into thermal contact with said BBO crystal device, and any one of an electrical cooling apparatus, a liquid nitrogen cryostat, an He cryostat, a Stirling refrigerating machine and a closed cycle refrigerating machine each of which serves to cool said cold finger and perform temperature control.

3. The laser beam generating apparatus as claimed in claim 2, wherein said BBO crystal device is preserved in an adiabatic vacuum container.

4. A laser beam generating apparatus comprising:
   a first laser beam source which oscillates in a near infrared-ray region to generate a laser beam;
   second higher harmonic wave generating means for generating, from the laser beam emitted from said first laser beam source, a second higher harmonic wave having a half wavelength of the laser beam emitted from said first laser beam source;
   splitting means for splitting the second higher harmonic wave;
   a second laser beam source which is supplied with a part of the second higher harmonic wave thus split to be excited and oscillated, thereby generating a laser beam of substantially 700 nm in wavelength;
   fourth higher harmonic wave generating means for generating a fourth higher harmonic wave from the remaining part of the second higher harmonic wave;
   sum frequency mixing means composed of a BBO crystal device to which the laser beam of substantially 700 nm in wavelength and the fourth higher harmonic wave are input; and
   means for controlling the temperature of said BBO crystal device to substantially 100K or less, thereby generating a laser beam of substantially 193 nm in wavelength as an output of said sum frequency mixing means.

5. The laser beam generating apparatus as claimed in claim 4, wherein said first laser beam source is a solid-state laser doped with any one kind of Nd-ion and Cr-ion, and said second laser beam source is formed of any one kind of a Ti:Sapphire laser and an alexandrite laser.

6. The laser beam generating apparatus as claimed in claim 4, wherein said temperature control means has a cold finger which is brought into thermal contact with said BBO crystal device, and any one of an electrical cooling apparatus, a liquid nitrogen cryostat, an He cryostat, a Stirling refrigerating machine and a closed cycle refrigerating machine each of which serves to cool said cold finger and perform temperature control.

7. The laser beam generating apparatus as claimed in claim 6, wherein said BBO crystal device is preserved in an adiabatic vacuum container.

8. A laser beam generating method using a BBO crystal device to utilize a non-linear optical effect, characterized by comprising the step of controlling the temperature of said BBO crystal device to 273K or less to generate a laser beam of 200 nm or less in wavelength.

9. The laser beam generating method as claimed in claim 8, wherein said temperature control step includes a step of cooling said BBO crystal device through a cold finger coming into thermal contact with said BBO crystal device by any one of an electrical cooling apparatus, a liquid nitrogen cryostat, an He cryostat, a Stirling refrigerating machine and a closed cycle refrigerating machine, thereby controlling the temperature of the said BBO crystal device.

10. The laser beam generating method as claimed in claim 9, wherein said BBO crystal device is preserved in an adiabatic vacuum container.

11. A laser beam generating method comprising:
    a second higher harmonic wave generating step of generating, from a laser beam emitted from a first laser beam source oscillating in a near infrared-ray region, a second higher harmonic wave having a half wavelength of the laser beam emitted from said first laser beam source;
    a splitting step of splitting the second higher harmonic wave;
    a laser beam generating step of inputting to a second laser beam source a part of the second higher harmonic wave thus split to excite and oscillate said second laser beam source thereby generating a laser beam of substantially 700 nm in wavelength;
    a fourth higher harmonic wave generating step of generating a fourth higher harmonic wave from the remaining part of the second higher harmonic wave;
    a sum frequency mixing step using a BBO crystal device to which the laser beam of substantially 700 nm in wavelength and the fourth higher harmonic wave are input; and
    a step of controlling the temperature of said BBO crystal device to substantially 100K or less, thereby generating a laser beam of substantially 193 nm in wavelength as an output of said sum frequency mixing step.

12. The laser beam generating method as claimed in claim 11, wherein said first laser beam source is a solid-state laser doped with any one kind of Nd-ion and Cr-ion, and said second laser beam source is formed of any one kind of a Ti:Sapphire laser and an alexandrite laser.

13. The laser beam generating method as claimed in claim 11, wherein said temperature control step cools said BBO crystal device through a cold finger coming into thermal contact with said BBO crystal device by any one of a liquid nitrogen cryostat, an He cryostat, a Stirling refrigerating machine and a closed cycle refrigerating machine, thereby performing the temperature control.

14. The laser beam generating method as claimed in claim 13, wherein said BBO crystal device is preserved in an adiabatic vacuum container.

* * * * *

UNITED STATES PATENT AND TRADEMARK OFFICE
CERTIFICATE OF CORRECTION

PATENT NO.    : 6,240,111 B1
DATED         : May 29, 2001
INVENTOR(S)   : Shigeo Kubota et al.

It is certified that error appears in the above-identified patent and that said Letters Patent is hereby corrected as shown below:

<u>Title page,</u>
Foreign Application PriorityData, AFTER "(JP)" change "10-10528" to -- 10-10524 --.

<u>Column 1,</u>
Line 43, after "and" change "2.0" to -- 2.1 --.

<u>Column 4,</u>
Line 47, after "T and" change "To" to -- $T_o$ --.

Signed and Sealed this

Nineteenth Day of February, 2002

*Attest:*

JAMES E. ROGAN
*Attesting Officer*            *Director of the United States Patent and Trademark Office*